US012789433B2

(12) United States Patent
Mitsuma et al.

(10) Patent No.: US 12,789,433 B2
(45) Date of Patent: Nov. 10, 2026

(54) MOLDING MANAGEMENT SYSTEM

(71) Applicant: SEIKO EPSON CORPORATION, Tokyo (JP)

(72) Inventors: Yusuke Mitsuma, Shiojiri (JP); Kosuke Atsuta, Shiojiri (JP); Yoshiaki Otsuki, Matsumoto (JP)

(73) Assignee: SEIKO EPSON CORPORATION (JP)

(*) Notice: Subject to any disclaimer, the term of this patent is extended or adjusted under 35 U.S.C. 154(b) by 428 days.

(21) Appl. No.: 18/417,327

(22) Filed: Jan. 19, 2024

(65) Prior Publication Data

US 2024/0246275 A1 Jul. 25, 2024

(30) Foreign Application Priority Data

Jan. 20, 2023 (JP) ................................ 2023-007140

(51) Int. Cl.
*B29C 45/76* (2006.01)
*G06Q 50/04* (2012.01)

(52) U.S. Cl.
CPC ........... *B29C 45/768* (2013.01); *G06Q 50/04* (2013.01)

(58) Field of Classification Search
CPC ...... B29C 45/768; B29C 45/76; G06Q 50/04; G06Q 10/06395; G06T 7/0004; G06T 2207/30164; G06V 10/764; G01V 1/50; G01V 1/48; E21B 47/005; E21B 2200/20
See application file for complete search history.

(56) References Cited

U.S. PATENT DOCUMENTS 9,494,932 B2 * 11/2016 Kawai .................... G05B 23/00
2004/0148136 A1 7/2004 Sasaki et al.

FOREIGN PATENT DOCUMENTS

CN 106779592 A * 5/2017 ........... G06Q 10/103
JP 2004-164026 A 6/2004
JP 2004-318262 A 11/2004

* cited by examiner

*Primary Examiner* — Tung S Lau
(74) *Attorney, Agent, or Firm* — Harness, Dickey & Pierce, P.L.C.

(57) ABSTRACT

A molding management system includes a storage section configured to store molded article information including information on a number of defective articles for each item of molded article molded in a first period and information on a number of defective articles for each item of molded article molded in a second period, which is longer than the first period, a calculation section configured to generate a report based on the molded article information, and an output section that outputs the report generated by the calculation section. The report includes identification information, which is information for identifying an item of a molded article, information related to an actual defect rate for each item of molded article molded in the first period, information related to a defect rate target for each item of molded article in the first period, and information related to an actual defect rate for each item of molded article molded in the second period.

4 Claims, 5 Drawing Sheets

300

MONTHLY QUALITY REPORT

RG1

| CUSTOMER INFO. | ○○ CORPORATION | FACTORY NAME | ○○ FACTORY |
|---|---|---|---|
| TARGET PERIOD | FROM JULY 1, 2022, 00:00 TO JULY 30, 2022, 23:59 | | |

| MOLDED ARTICLE ITEM | MONTHLY DEFECTS (PIECES) | MONTHLY INPUT (PIECES) | TARGET (ppm) | MONTHLY DEFECT RATE (ppm) | ALARM INFORMATION | YEARLY DEFECT RATE (ppm) | YEARLY INPUT (PIECES) |
|---|---|---|---|---|---|---|---|
| PRODUCT A | 159 | 10000 | 1000 | 15900 | ABNORMAL | 5349 | 43000 |
| PRODUCT B | 2 | 1600 | 1000 | 1250 | WARNING | 1222 | 9000 |
| PRODUCT C | 12 | 10000 | 1000 | 1200 | WARNING | 850 | 40000 |
| PRODUCT D | 0 | 5000 | 1000 | 0 | NORMAL | 250 | 20000 |

G1

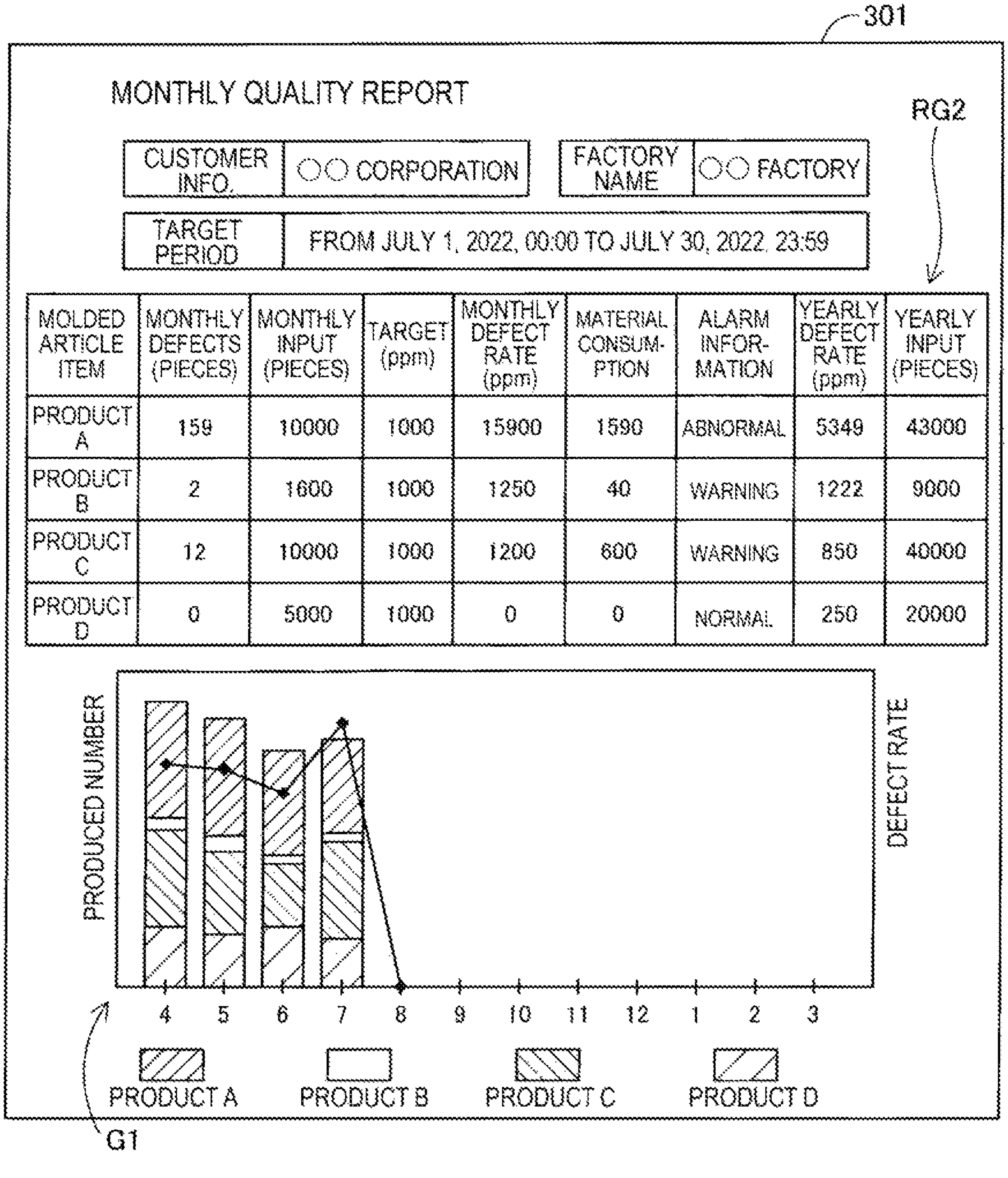

MONTHLY QUALITY REPORT

| CUSTOMER INFO. | ○○ CORPORATION | FACTORY NAME | ○○ FACTORY |
|---|---|---|---|
| TARGET PERIOD | FROM JULY 1, 2022, 00:00 TO JULY 30, 2022, 23:59 | | |

| MOLDED ARTICLE ITEM | MONTHLY DEFECTS (PIECES) | MONTHLY INPUT (PIECES) | TARGET (ppm) | MONTHLY DEFECT RATE (ppm) | MATERIAL CONSUM-PTION | ALARM INFOR-MATION | YEARLY DEFECT RATE (ppm) | YEARLY INPUT (PIECES) |
|---|---|---|---|---|---|---|---|---|
| PRODUCT A | 159 | 10000 | 1000 | 15900 | 1590 | ABNORMAL | 5349 | 43000 |
| PRODUCT B | 2 | 1600 | 1000 | 1250 | 40 | WARNING | 1222 | 9000 |
| PRODUCT C | 12 | 10000 | 1000 | 1200 | 600 | WARNING | 850 | 40000 |
| PRODUCT D | 0 | 5000 | 1000 | 0 | 0 | NORMAL | 250 | 20000 |

FIG. 5

MOLDING MANAGEMENT SYSTEM

The present application is based on, and claims priority from JP Application Serial Number 2023-007140, filed Jan. 20, 2023, the disclosure of which is hereby incorporated by reference herein in its entirety.

BACKGROUND

1. Technical Field

The present disclosure relates to a molding management system.

2. Related Art

JP-A-2004-164026 discloses a management support system for supporting manufacturing management of products. In this management support system, the defect rate of each product manufactured on a specific date is displayed on a daily report display screen.

The molding management system may generate a report showing representative values of molded article defect rates during a predetermined period for each item of molded article. In this case, the user determines, based on the defect rate of each item of molded article displayed in the report, which item should be preferentially subjected to a countermeasure for reducing the defect rate. However, if the predetermined period is, for example, a one month period, and the defect rate for an item during the most recent one week is higher than the defect rate before that, then the average value of the defect rate for a one month period for the item will be lower than the defect rate for the most one recent week. In this case, there is a high possibility that the user determines that it is not necessary to preferentially execute any countermeasure for reducing the defect rate with respect to the item described above. As described above, it is desirable that a technique in which, even when the defect rate varies within a predetermined period, the user can correctly and easily determine an item for which a countermeasure for reducing the defect rate should be preferentially executed.

SUMMARY

According to a first aspect of the present disclosure, a molding management system is provided. This molding management system includes a storage section configured to store molded article information including information on a number of defective articles for each item of molded article that was molded in a first period and information on a number of defective articles for each item of molded article that was molded in a second period, which is longer than the first period; a calculation section configured to generate a report based on the molded article information; and an output section that outputs the report generated by the calculation section, the report includes identification information, which is information for identifying an item of a molded article, information related to an actual defect rate for each item of molded article molded in the first period, information related to a defect rate target for each item of molded article in the first period, and information related to an actual defect rate for each item of molded article molded in the second period.

According to a second aspect of the present disclosure, a molding management system is provided. This molding management system includes a storage section configured to store molded article information including information on a number of defective articles for each item of molded article inspected in a first period and information on a number of defective articles for each item of molded article inspected in a second period, which is longer than the first period; a calculation section configured to generate a report based on the molded article information; and an output section that outputs the report generated by the calculation section, the report includes identification information, which is information for identifying an item of a molded article, information related to an actual defect rate for each item of molded article inspected in the first period, information related to a defect rate target for each item of molded article in the first period, and information relating to an actual defect rate for each item of molded article inspected in the second period.

BRIEF DESCRIPTION OF THE DRAWINGS

FIG. 5 is a diagram illustrating an example of a report generated by a calculation section in a second embodiment.

DESCRIPTION OF EMBODIMENTS

A. First Embodiment

Figure 1:
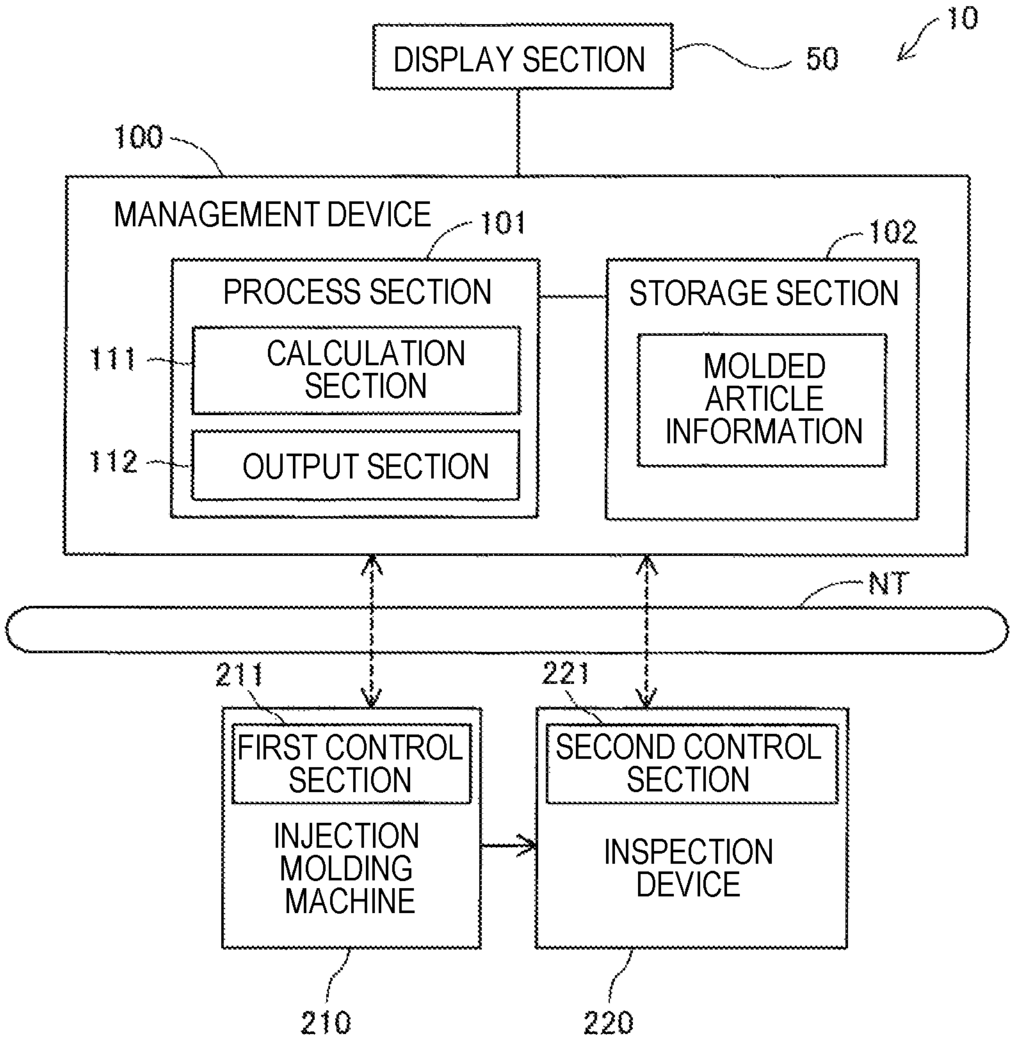
FIG. 1 is an explanatory view showing a schematic configuration of a molding management system.

FIG. 1 is an explanatory view showing a schematic configuration of a molding management system 10. The molding management system 10 includes a management device 100 and a display section 50. The management device 100 is communicably connected to an injection molding machine 210 and an inspection device 220. In this embodiment, the management device 100 is configured to be able to communicate with these apparatuses via a network NT. The network NT may be, for example, a LAN, a WAN, or the Internet. Note that the management device 100 may be communicably connected to a plurality of injection molding machines 210 and inspection devices 220.

The injection molding machine 210 is an apparatus that performs injection molding. The injection molding machine 210 includes a first control section 211, an injection device (not shown) and a mold clamping device (not shown). A molding die having a cavity is mounted on the mold clamping device. The molding die may be made of metal, ceramic, or resin. A molding die made of metal is referred to as a metal mold. The first control section 211 is configured by a computer that is equipped with one or more processors, a storage device, and an input-output interface for inputting and outputting signals between the computer and external devices. The first control section 211 may be configured by a plurality of computers. A second control section 221 of the inspection device 220 has a configuration similar to that of the first control section 211.

The first control section 211 controls each section of the injection molding machine 210 to perform injection molding to mold a molded article. More specifically, the first control section 211 controls the mold clamping device to clamp the molding die and controls the injection device to inject the molding material, which was obtained by plasticizing material, into the molding die, and by this, molding a molded article having a shape corresponding to the shape of the cavity provided in the molding die. The molded article is transported to the inspection device 220 by a transporting apparatus such as a removal robot (not shown).

The inspection device 220 is an apparatus for inspecting a molded article. The inspection device 220 includes the second control section 221 and a camera (not shown). The second control section 221 controls the camera to capture an image of the molded article and performs image analysis of the captured molded article to perform dimension measurement and appearance inspection of the molded article. The second control section 221 measures, for example, the height, the total length, the total width, or the like of the molded article as dimensions of the molded article. In the appearance inspection, the second control section 221 inspects for defects in the molded article, such as damage or warpage. The second control section 221 determines whether or not the molded article is defective based on the result of the dimension and appearance inspections for each molded article, and transmits the determination result to the management device 100. Note that the inspection device 220 may measure the dimension of the molded article by using various displacement sensors or length measurement sensors, instead of a camera.

The display section 50 is configured by a liquid crystal display provided in the management device 100. The display section 50 displays various kinds of information output from the management device 100. The display section 50 may have a touch panel function. Note that the display section 50 may not be included in the management device 100, and may be, for example, a display of a device such as a computer, a tablet terminal, or a smartphone, which are separate from the management device 100. In this case, the display section 50 may acquire information from the management device 100 via the network NT or a cloud server.

The management device 100 is configured by a computer including a process section 101 and a storage section 102. The processing section 101 includes one or a plurality of processors and a main storage device. The storage section 102 is configured by an auxiliary storage device such as a hard disk drive.

Molded article information is stored in the storage section 102. In the present embodiment, the molded article information includes information on the number of defective articles for each item of molded article molded in the first period, information on the number of non-defective articles molded in the first period for each item of molded article, information on the number of defective articles molded in the second period for each item of molded article, and information on the number of non-defective articles molded in the second period for each item of molded article. Here, the second period is longer than the first period. For example, the first period is a one month period and the second period is a one year period. In the present embodiment, the second period is a period including the first period. For example, when the second period is a one year period from Jan. 1, 2022 to Dec. 31, 2022, then the first period is a one month period during the period from Jan. 1, 2022 to Dec. 31, 2022. In the following, items of molded articles are also referred to as molded article items.

Further, the storage section 102 stores identification information, which is information for identifying items of molded articles, and information relating to the defect rate target for each item of molded article in the first period. The identification information is, for example, an item name of the molded article, an ID number assigned to each item, or the like.

The processing section 101 includes a calculation section 111 and an output section 112. The calculation section 111 and the output section 112 are realized by the processing section 101 executing a program stored in the storage section 102. Note that these may be realized by circuitry.

The calculation section 111 generates a report based on the molded article information stored in the storage section 102.

The output section 112 outputs the report generated by the calculation section 111. In the present embodiment, the output section 112 outputs the report to the display section 50. Note that the output section 112 may output the report to a printer. The output section 112 may output the report to another device via the network NT.

Figure 2:
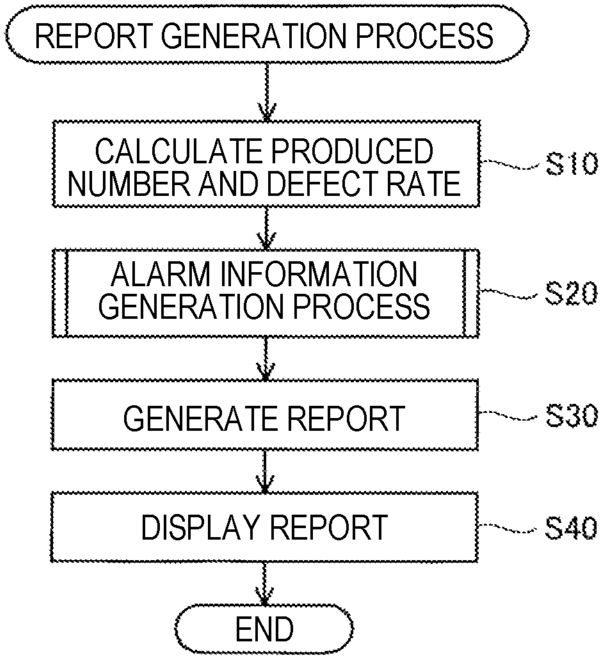
FIG. 2 is a flowchart of a report generation process executed by a management device.

FIG. 2 is a flowchart of a report generation process executed by the management device 100. The report generation process is executed, for example, when the management device 100 receives an instruction from the user to execute the report generation process. For example, when the first period is a one month period, the management device 100 may execute the report generation process at the end of the month.

In step S10, for each of the molded article items molded in the first period, the calculation section 111 calculates the produced number of molded article items that were produced in the first period and the defect rate of the molded articles in the first period using the number of defective articles in the first period and the number of non-defective articles in the first period. Here, the number of defective articles in the first period is the number of molded articles that, from among the molded articles that were molded in the first period, the inspection device 220 determined were defective articles. The number of non-defective articles in the first period is the number of molded articles that, from among the molded articles molded in the first period, the inspection device 220 determined were non-defective. The produced number of molded articles in the first period is the number of molded articles that were molded in the first period. Note that the produced number of molded articles is also referred to as the input number of molded articles.

In step S10, for each of the molded article items molded in the first period, the calculation section 111 calculates the produced number of molded article items that were produced in the second period and the defect rate of the molded articles in the second period using the number of defective articles in the second period and the number of non-defective articles in the second period. Here, the number of defective articles in the second period is the number of molded articles that, from among the molded articles that were molded in the second period, the inspection device 220 determined were defective articles. The number of non-defective articles in the second period is the number of molded articles that, from among the molded articles molded in the second period, the inspection device 220 determined were non-defective.

The produced number of molded articles in the first period is calculated by the following equation (1). Note that the number of defective articles in the first period and the number of non-defective articles in the first period, which are used in equation (1) and equation (2) (to be described later), are respectively the number of defective articles in the first period and the number of non-defective articles in the first period of the same item as the molded article item for which the produced number and the defect rate of the molded article item in the first period are calculated. Hereinafter, the produced number of molded articles that were produced in the first period is simply referred to as the produced number of the first period.

$$\text{(produced number of the first period)} = \text{(number of defective articles in the first period)} + \text{(number of non-defective articles in the first period)} \quad (1)$$

The defect rate of the molded articles in the first period is calculated by the following equation (2). Hereinafter, the defect rate of the molded articles in the first period is simply referred to as the defect rate in the first period.

$$\text{(defect rate in the first period)} = \text{(number of defective articles in the first period)} \div \text{((number of defective articles in the first period)} + \text{(number of non-defective articles in the first period))} \quad (2)$$

The produced number of molded articles in the second period is calculated by the following equation (3). Note that the number of defective articles in the second period and the number of non-defective articles in the second period, which are used in equation (3) and equation (4) (to be described later), are respectively the number of defective articles in the second period and the number of non-defective articles in the second period of the same item as the molded article item for which the produced number and the defect rate of the molded article item in the second period are calculated.

Hereinafter, the produced number of molded articles that were produced in the second period is simply referred to as the produced number of the second period.

$$\text{(produced number of the second period)} = \text{(number of defective articles in the second period)} + \text{(number of non-defective articles in the second period)} \quad (3)$$

The defect rate of the molded articles in the second period is calculated by the following equation (4). Hereinafter, the defect rate of the molded articles in the second period is simply referred to as defect rate in the second period.

$$\text{(defect rate in the second period)} = \text{(number of defective articles in the second period)} \div \text{((number of defective articles in the second period)} + \text{(number of non-defective articles in the second period))} \quad (4)$$

In step S20, the calculation section 111 executes an alarm information generation process. The alarm information generation process is a process in which the calculation section 111 generates alarm information for each molded article item based on information related to the actual defect rate for each molded article item molded in the first period, information related to the defect rate target for each molded article item in the first period, and information related to the actual defect rate for each molded article item molded in the second period.

Figure 3:
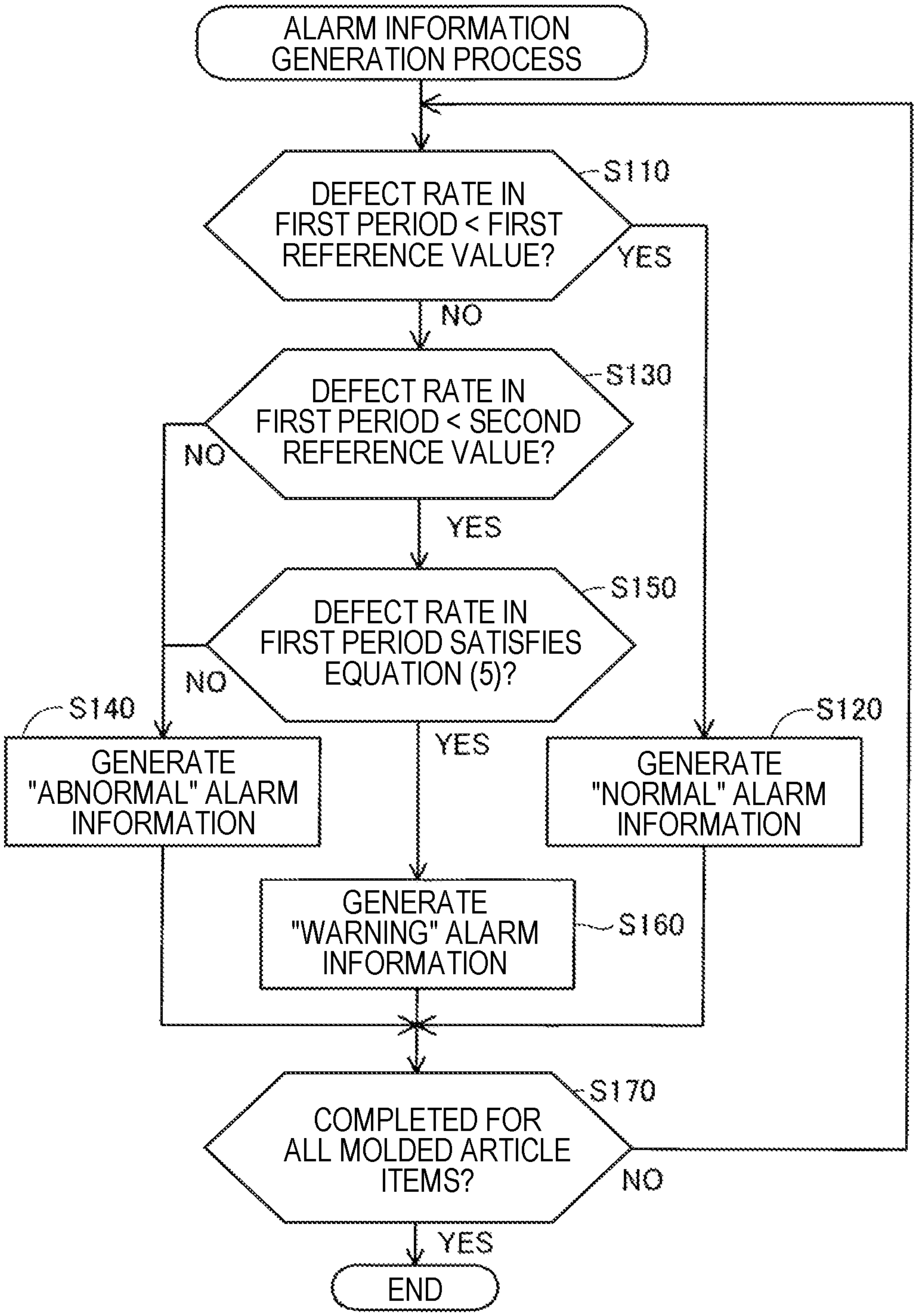
FIG. 3 is a flowchart of an alarm information generation process.

FIG. 3 is a flowchart of the alarm information generation process. In the alarm information generation process, the calculation section 111 generates alarm information indicating abnormal, warning, or normal for each molded article item.

In step S110, the calculation section 111 determines whether or not the defect rate in the first period for a specific molded article item is lower than a first reference value. Here, the first reference value is a value set in advance for each molded article item, and is the defect rate target value for the first period.

When it is determined in step S110 that the defect rate in the first period is lower than the first reference value, then in step S120 the calculation section 111 generates alarm information of "normal" for the above-described molded article item.

When it is determined in step S110 that the defect rate in the first period is not lower than the first reference value, then in step S130 the calculation section 111 determines whether or not the defect rate in the first period is lower than a second reference value for the molded article item. Here, the second reference value is a value set in advance for each molded article item, and is a value larger than the first reference value. The second reference value is, for example, desirably a value of 120% or more and 180% or less of the first reference value.

When it is determined in step S130 that the defect rate in the first period is not lower than the second reference value, then in step S140, the calculation section 111 generates alarm information of "abnormal" for the above-described molded article item.

When it is determined in step S130 that the defect rate in the first period is lower than the second reference value, the calculation section 111 determines in step S150 whether or not the defect rate in the first period satisfies the following equation (5) for the above-described molded article item. Here, the standard deviation in equation (5) is a standard deviation of the defect rate in each divided period when the second period is divided into a plurality of periods having the same length as the first period. For example, when the first period is the one month period of July and the second period is four months of April to July, the standard deviation of equation (5) is the standard deviation of the defect rate for each month of April to July.

$$\text{((defect rate in the first period)} - \text{(standard deviation))} < \text{(defect rate in the second period)} < \text{((defect rate in the first period)} + \text{(standard deviation))} \quad (5)$$

When it is determined in step S150 that the defect rate in the first period does not satisfy equation (5), then in step S140 the calculation section 111 generates alarm information of "abnormal" for the above-described molded article item.

When it is determined in step S150 that the defect rate in the first period satisfies equation (5), then in step S160 the calculation section 111 generates alarm information of "warning" for the above-described molded article item.

In step S170, the calculation section 111 determines whether or not alarm information has been generated for all of the molded article items molded in the first period. When it is determined that alarm information was not generated for all of the molded article items molded in the first period, the calculation section 111 returns the process to step S110.

When it is determined that the alarm information has been generated for all the molded article items molded in the first period, the calculation section 111 ends the alarm information generation process.

In step S30 of the report generation process shown in FIG. 2, the calculation section 111 generates a report 300.

Figure 4:
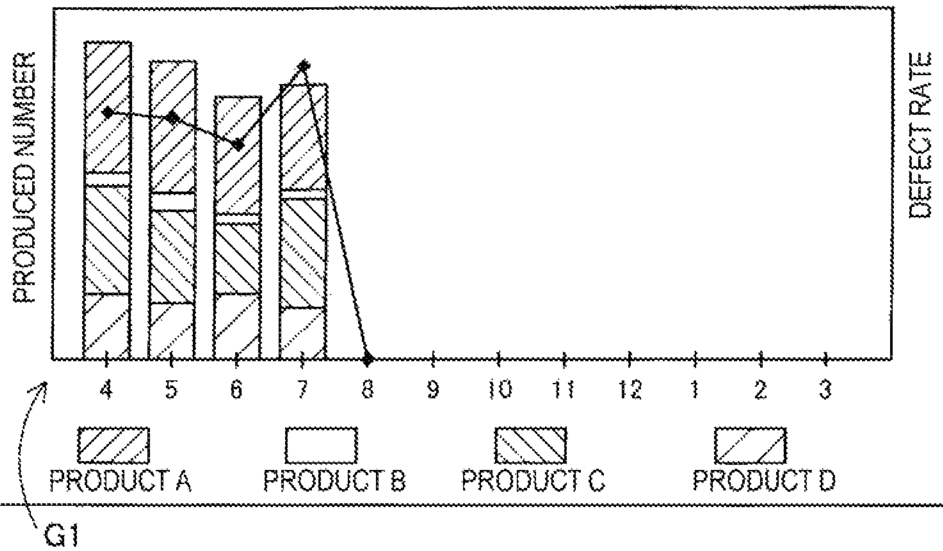
FIG. 4 is a diagram illustrating an example of a report generated by a calculation section.

FIG. 4 is a diagram illustrating an example of the report 300 generated by the calculation section 111. In the example shown in FIG. 4, the first period is the one month period from Jul. 1, 2022 to Jul. 30, 2022, and the second period is four months from Apr. 1, 2022 to Jul. 30, 2022. When the first period is a one month period of a specific month and the second period is a period in monthly units of one month or more and 12 months or less in a specific year, then the number of defective articles in the first period is also referred to as monthly defects, the produced number of the first period is also referred to as monthly input, the defect rate in the first period is also referred to as a monthly defect rate, the defect rate in the second period is also referred to as a yearly defect rate, and the produced number of the second period is also referred to as a yearly input number.

The report 300 is provided with a defect ratio display region RG1. In the defect ratio display region RG1 are displayed, for each molded article item that was molded in the first period, in order from the left, the name of the molded article item, which is identification information, the monthly defects, which is the number of defective articles in the first period, the monthly input, which is the produced number of the first period, the defect rate target value for the first period, which is the first reference value, the monthly defect rate, which is the defect rate in the first period, alarm information, the yearly defect rate, which is the defect rate in the second period, and the yearly input number, which is the produced number of the second period. That is, the report 300 includes identification information, information on the actual number of defective articles for each molded article item molded in the first period, information on the actual number of molded article items molded in the first period, information related to the defect rate target for each molded article item in the first period, information related to the actual defect rate for each molded article item molded in the first period, alarm information for each molded article item, information related to the actual defect rate for each molded article item molded in the second period, and information on the actual number of molded article items molded in the second period.

In the defect ratio display region RG1, the respective molded article items are arranged and displayed in order from the highest monthly defect rate, which is the defect rate in the first period, downward. That is, the calculation section 111 generates the report 300 with identification information arranged in descending order of high to low defect rate of the first period.

A graph G1 is displayed below the defect ratio display region RG1. The horizontal axis of the graph G1 indicates each month from April 2022 to March 2023. The vertical axis on the left side of the graph G1 represents the produced number of molded articles, and the vertical axis on the right side represents the defect rate of molded articles. The bar graph shows the number of molded articles produced each month, for each molded article item. The line graph shows the defect rate of all molded articles that were produced each month.

In step S40 of the report generation process illustrated in FIG. 2, the output section 112 outputs the report 300 generated in step S30 to the display section 50 and causes the display section 50 to display the report 200. The report generation process is executed as was described above.

According to the molding management system 10 of the first embodiment described above, the calculation section 111 generates the report 300 that shows, for each molded article item that was molded in the first period, identification information, the number of defective articles in the first period, the produced number of the first period, the defect rate target value for the first period, the defect rate in the first period, alarm information, the defect rate in the second period, and the produced number of the second period. Hereinafter, the effects of the report 300 when the user is determining items for which countermeasures for reducing the defect rate should be preferentially executed will be described using the report 300 illustrated in FIG. 4.

In the present embodiment, the monthly defect rate, which is the defect rate in the first period, the defect rate target value for the first period, and the yearly defect rate, which is the defect rate in the second period, are displayed in the report 300. Of the four molded article items displayed in the report 300, the monthly defect rates of Product A, Product B, and Product C exceed their respective target values. Of the three molded article items described above, product A has a monthly defect rate much higher than the target value, as compared with those of products B and C. Therefore, by comparing the monthly defect rates with the target values, the user can easily determine that of the three molded article items described above, countermeasures for reducing the defect rate should be preferentially executed for product A.

The monthly defect rate of product B is slightly higher than the monthly defect rate of product C. Therefore, when only the monthly defect rates are compared, there is a high possibility that the user will determine that countermeasures for reducing the defect rate should be preferentially executed for product B rather than for product C. However, the difference between the monthly defect rate and the yearly defect rate of product B is smaller than the difference between the monthly defect rate and the yearly defect rate of product C. Therefore, it can be deduced that the defect rate of product B did not suddenly increase in July, which is the first period. Conversely, it can be deduced that the defect rate of product C suddenly increased in July, which is the first period. Therefore, there is a high possibility that some trouble occurred in the molding of product C in July, which is the first period. Therefore, countermeasures for reducing the defect rate should be preferentially executed for product C rather than for product B. Since the monthly defect rate and the yearly defect rate of each molded article item are displayed in the report 300, even when the defect rate varies within the second period, it is easy for the user to determine that countermeasures for reducing the defect rate should be preferentially executed with respect to product C rather than product B by comparing the monthly defect rate with the yearly defect rate.

In the present embodiment, the report 300 displays the monthly defects, which is the number of defective articles in the first period, and the monthly input, which is the produced number of the first period. Although there is no large difference between the monthly defect rate of product B and the monthly defect rate of product C, the monthly input of product C is greater than the monthly input of product B, and there are more monthly defects of product C than monthly defects of product B. Therefore, it is possible to reduce the number of defective articles that will be produced to a greater extent by reducing the defect rate of product C, which has a larger monthly input than product B, rather than by reducing the defect rate of product B. In the report 300, the monthly defects and the monthly input of each molded article item are displayed. Therefore, by comparing the monthly failure number or the monthly input of each molded article item, the user can easily determine that countermeasures for reducing the defect rate should be preferentially executed for product C rather than for product B.

In this embodiment, alarm information is displayed in the report 300. The alarm information for product A is "abnormal", the alarm information for products B and C is "warning", and the alarm information for product D is "normal". Therefore, it is easy for the user to determine that countermeasures for reducing the defect rate should be executed with the highest priority for product A, which among the above-described four molded article items has alarm information of "abnormal". The user can easily determine that next after product A, countermeasures for reducing defect rate should be executed for the products B and C, which have alarm information of "warning".

In the present embodiment, the calculation section 111 generates alarm information based on information related to the actual defect rate for each molded article item that was molded in the second period. To be specific, in step S150 of the alarm information generation process illustrated in FIG. 3, the calculation section 111 determines whether or not the defect rate in the first period satisfies equation (5). Then, the calculation section 111 generates alarm information of "abnormal" for molded article items with a defect rate in the first period that does not satisfy equation (5), and generates alarm information of "warning" for molded article items with a defect rate in the first period that satisfies equation (5). Molded article items with a defect rate in the first period that does not satisfy the equation (5) are molded article items with a defect rate in the first period that greatly deviates from the range of variation in the defect rate of the second period. The calculation section 111 generates alarm information of "abnormal" for molded article items described above. Therefore, the user can easily determine that countermeasures for reducing defect rate should be preferentially executed with respect to molded article items with a defect rate in the first period that greatly deviates from the range of variation in the defect rate in the second period.

In the present embodiment, in the report 300, the molded article items are arranged and displayed from high to low defect rate in the first period in descending order. Therefore, the user can easily recognize for which molded article items countermeasures should be executed for reducing the defect rate.

In the present embodiment, the second period is a period including the first period. Therefore, the user can easily compare the defect rate in the first period and the defect rate in the second period.

B. Second Embodiment

In the second embodiment, in addition to storing the molded article information, the identification information, and the information on the defect rate target for each item of molded article in the first period, the storage section 102 stores the amount of material required for molding a molded article for each molded article item. The amount of material required for molding a molded article is the amount of material required to form a single molded article. The amount of material required for molding a molded article is, for example, an average value of the weight per each molded article.

In step S10 of the report generation process shown in FIG. 2, in addition to calculating the produced number of the first period, the defect rate in the first period, the produced number of the second period, and the defect rate in the second period, the calculation section 111 calculates the material consumption for each of the molded article items molded in the first period. Here, the material consumption is the amount of material that was used for molding defective articles, among the molded articles that were molded in the first period. The material consumption is calculated by the following equation (6).

$$(\text{material consumption}) = (\text{amount of material required for molding a molded article}) \times (\text{number of defective articles in the first period}) \tag{6}$$

FIG. 5 is a diagram showing an example of the report 301 generated by the calculation section 111 in step S30 of the report generation process shown in FIG. 2. In addition to the information displayed in the defect ratio display region RG1 of the first embodiment, the material consumption of each molded article item that was molded in the first period is displayed in the defect ratio display region RG2. That is, the report 301 includes information on the actual consumption of material for each molded article item molded in the first period.

According to the molding management system 10 in the second embodiment described above, the material consumption of each molded article item molded in the first period is displayed in the report 301. Therefore, the user can compare the amount of the material used for molding defective articles in the first period for each molded article item. In the example of the report 301 shown in FIG. 5, there is no large difference between the monthly defect rate of product B and the monthly defect rate of product C, but the material consumption of product C is larger than the material consumption of product B. Therefore, material consumption can be reduced more by reducing the defect rate of product C than by reducing the defect rate of product B. By comparing the material consumption of the molded article items, the user can easily determine that countermeasures for reducing the defect rate should be preferentially executed for product C rather than for product B.

C. Other Embodiments (C-1) In the above-described embodiments, the report 300 includes information related to the actual number of defective articles for each item of molded article that was molded in the first period and information related to the actual number of molded articles for each item of molded article that was molded in the first period. On the other hand, the report 300 may include any one of information related to the number of defective articles for each item of molded article that was molded in the first period, information related to the actual number of non-defective articles for each item of molded article that was molded in the first period, and information related to the actual number of molded articles for each item of molded article that was molded in the first period.

(C-2) In the above embodiment, the calculation section 111 generates alarm information for each molded article item, based on information related to the actual defect rate for each molded article item molded in the first period, information related to the defect rate target for each molded article item in the first period, and information related to the actual defect rate for each molded article item molded in the second period. On the other hand, the calculation section 111 may not generate the alarm information based on information related to the actual defect rate for each molded article item molded in the second period. In this case, step S150 may not be executed in the alarm information generation process illustrated in FIG. 3. In the case that step S150 is not executed, if the calculation section 111 determines in step S130 that the defect rate in the first period for a specific molded article item is lower than the second reference value, then in step S160 the calculation section 111 generates alarm information of "warning" for the above-described molded article item.

(C-3) In the above embodiment, the calculation section 111 generates alarm information. In contrast, the calculation section 111 may not generate alarm information. In this case, the report 300 may not include alarm information.

(C-4) In the above embodiment, the calculation section 111 generates the report 300 in which identification information is arranged from high to low in descending order of defect rate in the first period. In contrast, the calculation section 111 may generate the report 300 in which the identification information is not arranged from high to low in descending order of defect rate in the first period.

(C-5) In the above embodiment, the second period is a period that includes the first period. On the other hand, the second period may be a period that does not include the first period. For example, the first period may be the one month period of July 2022, and the second period may be three months from April 2022 to June 2022. In this case, the defect rate in the first period can be easily compared with the past defect rate.

(C-6) In the above embodiment, the report 300 includes identification information, information relating to the actual number of defective articles for each molded article item that was molded in the first period, information relating to the actual number of molded article items that were molded in the first period, information related to the defect rate target for each molded article item in the first period, information related to the actual defect rate for each molded article item that was molded in the first period, alarm information for each molded article item, information related to the actual defect rate for each molded article item that was molded in the second period, and information relating to the actual number of molded articles that were molded in the second period. On the other hand, of the above-described information, the report 300 may not include information related to the actual number of defective articles for each molded article item that was molded in the first period, information related to the actual number of molded articles for each molded article item that was molded in the first period, alarm information for each molded article item, and information related to the actual number of molded articles for each molded article item that was molded in the second period.

(C-7) In the above embodiment, the molded article information includes information relating to the number of non-defective articles that were molded in the first period for each item of molded article and information relating to the number of non-defective articles that were molded in the second period for each item of molded article. On the other hand, the molded article information may include information on the number of molded articles molded in the first period for each item of molded article and information on the number of molded articles molded in the second period for each item. In this case, in step S10 of the report generation process shown in FIG. 2, the produced number of the first period and the produced number of the second period may not be calculated.

(C-8) In the second embodiment, the material consumption, which is the amount of the material used for molding defective articles of the molded articles that were molded in the first period, is displayed in the report 301. In contrast, the report 301 is not limited to the amount of the material used for molding defective articles, and the amount of the material used for molding defective articles and non-defective articles, that is, the amount of the material used for molding all the molded articles, may be displayed.

(C-9) In the above embodiment, the number of defective articles in the first period is the number of molded articles among the molded articles molded in the first period that were determined to be defective by the inspection device 220. On the other hand, the number of defective articles in the first period may be, of the number of molded articles molded in the first period, the number of molded articles whose values that were measured during molding of the molded article by various sensors, such as a temperature sensor or a pressure sensor provided in the metal mold, exceeded a threshold value, which is a predetermined value, or the number of molded articles in which a value of operation data, such as injection pressure or temperature of the metal mold that was acquired from the injection molding machine 210, exceeded a threshold value. Similarly, the number of defective articles in the second period may be, of the number of molded articles molded in the second period, the number of molded articles whose values that were measured during molding of the molded article by various sensors, such as a temperature sensor or a pressure sensor provided in the metal mold, exceeded a threshold value, which is a predetermined value, or the number of molded articles in which a value of operation data, such as injection pressure or temperature of the metal mold that was acquired from the injection molding machine 210, exceeded a threshold value.

(C-10) In the above embodiment, the molded article information includes information on the number of defective articles for each item of molded article molded in the first period, information on the number of non-defective articles molded in the first period for each item of molded article, information on the number of defective articles molded in the second period for each item of molded article, and information on the number of non-defective articles molded in the second period for each item of molded article. On the other hand, the molded article information may include information on the number of defective articles for each item of molded article inspected in the first period, information on the number of non-defective articles for each item of molded article inspected in the first period, information on the number of defective articles for each item of molded article inspected in the second period, and information on the number of non-defective articles for each item of molded article inspected in the second period. In this case, the report may include the identification information, the information on the actual defect rate of each item of molded article inspected in the first period, the information on the defect rate target of each item of molded article in the first period, and the information on the actual defect rate of each item of molded article inspected in the second period.

D. Other Forms

The present disclosure is not limited to the embodiments described above, but can be realized in various forms without departing from the scope of the present disclosure. For example, the present disclosure can also be realized by the following aspects. The technical features in the above embodiments that correspond to the technical features in each aspect described below can be replaced or combined as appropriate to solve some or all of the issues of this disclosure or to achieve some or all of the effects of this disclosure. If a technical feature is not described as an essential feature in the present specification, the technical feature can be deleted as appropriate.

(1) According to an aspect of the present disclosure, a molding management system is provided. The molding management system includes a storage section configured to store molded article information including information on a number of defective articles for each item of molded article that was molded in a first period and information on a number of defective articles for each item of molded article that was molded in a second period, which is longer than the first period; a calculation section configured to generate a report based on the molded article information; and an output section that outputs the report generated by the calculation section, wherein the report includes identification information, which is information for identifying an item of a molded article, information related to an actual defect rate for each item of molded article molded in the first period, information related to a defect rate target for each item of molded article in the first period, and information related to an actual defect rate for each item of molded article molded in the second period.

According to the molding management system of this aspect, the user can compare the information on the actual defect rate for each item of molded article molded in the first period with the information on the actual defect rate for each item of molded article molded in the second period. Therefore, even when the defect rate varies in the second period, it is possible for the user to easily and correctly determine the item for which countermeasures for reducing the defect rate is to be preferentially executed.

(2) The above aspect may be such that the report includes any one of information related to an actual number of defective articles for each item of molded article molded in the first period, information related to an actual number of non-defective articles for each item of molded article molded in the first period, and information related to an actual number of molded articles for each item of molded article molded in the first period.

According to the molding management system of this aspect, the user can compare the information related to the actual number of defective articles for each molded article item molded in the first period, the information related to the actual number of non-defective articles for each item of molded article molded in the first period, or the information related to the actual number of molded articles for each item of molded article molded in the first period. Therefore, it is possible for the user to easily and correctly determine the item for which countermeasures for reducing the defect rate should be preferentially executed.

(3) The above aspects may be such that the calculation section generates alarm information for each item of molded article based on information related to an actual defect rate for each item of molded article molded in the first period and information on a defect rate target for each item of molded article in the first period and the report includes the alarm information for each item of molded article.

According to the molding management system of this aspect, when the user is to determine the item for which countermeasures for reducing the defect rate is to be preferentially executed, it is possible to easily perform the determination based on the alarm information.

(4) The above aspects may be such that the calculation section generates the alarm information based on information related to an actual defect rate for each item of molded article molded in the second period.

According to the molding management system of this aspect, when the user is to determine for which item countermeasures for reducing the defect rate should be preferentially executed, the user can easily perform the determination based on the information related to the actual defect rate for each item of molded article that was molded in the second period.

(5) The above aspects may be such that the calculation section generates the report with the identification information arranged from high to low in descending order of defect rate in the first period.

According to the molding management system of this aspect, it is possible for the user to easily grasp the item for which countermeasures for reducing the defect rate should be preferentially executed.

(6) The above aspects may be such that the storage section stores an amount of material required for molding a molded article and the report includes information related to actual consumption amounts of material for each item of molded article molded in the first period.

According to the molding management system of this aspect, when the user is to determine the item for which countermeasures for reducing the defect rate is to be preferentially executed, it is possible to easily perform the determination based on the information related to the actual consumption amount of the material.

(7) The above aspects may be such that the second period is a period including the first period.

According to the molding management system of this aspect, the user can easily compare the information on the actual defect rate for each item of molded article molded in the first period with the information on the actual defect rate for each item of molded article molded in the second period.

(8) According to an aspect of the present disclosure, a molding management system is provided. The molding management system includes a storage section configured to store molded article information including information on a number of defective articles for each item of molded article inspected in a first period and information on a number of defective articles for each item of molded article inspected in a second period, which is longer than the first period; a calculation section configured to generate a report based on the molded article information; and an output section that outputs the report generated by the calculation section, wherein the report includes identification information, which is information for identifying an item of a molded article, information related to an actual defect rate for each item of molded article inspected in the first period, information related to a defect rate target for each item of molded article in the first period, and information relating to an actual defect rate for each item of molded article inspected in the second period.

According to the molding management system of this aspect, the user can compare the information related to the actual defect rate for each item of molded article inspected in the first period and the information related to the actual defect rate for each item of molded article inspected in the second period. Therefore, even when the defect rate varies in the second period, it is possible for the user to easily and correctly determine the item for which countermeasures for reducing the defect rate is to be preferentially executed.

What is claimed is:

1. A molding management system configured to be communicably connected to an inspection device configured to measure one or more dimensions of molded articles molded by an injection molding machine in a first period and a second period that is longer than the first period to inspect each of the molded articles for a defect, in order to determine whether each of the molded articles is defective or non-defective, and to transmit a determination result to the molding management system, the molding management system comprising:
- a storage device configured to store based on the determination result:
  - a first number of first defective articles, the first defective articles being a first part of the molded articles determined by the inspection device to be defective in the second period;
  - a second number of first non-defective articles, the first non-defective articles being a second part of the molded articles determined by the inspection device to be non-defective in the second period;
  - a third number of second defective articles, the second defective articles being a third part of the molded articles determined by the inspection device to be defective in the first period;
  - a fourth number of second non-defective articles, the second non-defective articles being a fourth part of the molded articles determined by the inspection device to be non-defective in the first period;
  - identification information identifying an item of each of the molded articles; and
  - a first reference value which is a defect rate target for the item in the first period; and
- one or more processors configured to:
  - calculate a first produced number as a sum of the third number and the fourth number;
  - calculate a first defect rate as a ratio of the third number to the first produced number:
  - calculate a second produced number as a sum of the first number and the second number;
  - calculate a second defect rate as a ratio of the first number to the second produced number;
  - determine whether the first defect rate is lower than the first reference value;
  - determine whether the first defect rate is lower than a second reference value that is at least 120% and at most 180% of the first reference value;
  - generate alarm information indicating:
    - normal when the first defect rate is lower than the first reference value;
    - abnormal when the first defect rate is not lower than the second reference value; and
    - either the abnormal or a warning when the first defect rate is not lower than the first reference value and lower than the second reference value;
  - generate a report including the identification information, the first reference value, the first defect rate, the second defect rate, and the alarm information; and
  - output the report.

2. The molding management system according to claim 1, wherein
- the report includes any one of:
  - the third number;
  - the fourth number; and
  - the first produced number.

3. The molding management system according to claim 1, wherein
- the calculation section generates the alarm information based on information related to an actual defect rate for each item of molded article molded in the second period;
- when the first defect rate is not lower than the first reference value and lower than the second reference value, the one or more processors generate the alarm information indicating one of the abnormal or the warning based on the first defect rate and the second defect rate.

4. The molding management system according to claim 1, wherein
- the storage device stores an amount of a material required for molding the molded articles, and
- the report includes information related to an actual consumption amount of the material for the second defective articles and the second non-defective articles.

* * * * *